(12) United States Patent
Karaatanassov et al.

(10) Patent No.: US 10,298,561 B2
(45) Date of Patent: May 21, 2019

(54) PROVIDING A SINGLE SESSION EXPERIENCE ACROSS MULTIPLE APPLICATIONS

(71) Applicant: VMware, Inc., Palo Alto, CA (US)

(72) Inventors: Kiril Karaatanassov, Sofia (BG); Grigor Harbaliev, Sofia (BG); Mariana Valeva, Sofia (BG); Radoslav Nikolov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 14/822,306

(22) Filed: Aug. 10, 2015

(65) Prior Publication Data

US 2017/0006021 A1    Jan. 5, 2017

Related U.S. Application Data

(60) Provisional application No. 62/187,144, filed on Jun. 30, 2015.

(51) Int. Cl.
*H04L 29/06* (2006.01)

(52) U.S. Cl.
CPC ...... *H04L 63/0815* (2013.01); *H04L 63/0281* (2013.01)

(58) Field of Classification Search
CPC .................. H04L 63/0815; H04L 63/0281
USPC ............................................................ 726/8
See application file for complete search history.

(56) References Cited

U.S. PATENT DOCUMENTS

| | | | | |
|---|---|---|---|---|
| 6,728,884 B1* | 4/2004 | Lim | ...................... | H04L 63/0815 709/219 |
| 6,754,709 B1* | 6/2004 | Gbadegesin | ............ | H04L 29/06 709/227 |
| 7,200,804 B1* | 4/2007 | Khavari | ................ | G06F 17/243 707/E17.108 |
| 7,809,841 B1* | 10/2010 | Crouch | .................. | G06Q 30/08 705/37 |
| 7,864,716 B1* | 1/2011 | Manroa | ............. | H04L 29/12594 370/260 |
| 7,913,300 B1* | 3/2011 | Flank | ....................... | G06F 9/468 709/202 |
| 8,732,815 B2* | 5/2014 | Ogura | ..................... | G06F 21/31 726/12 |
| 8,990,893 B2* | 3/2015 | Greenlee | ................. | G06F 21/60 713/166 |
| 9,449,346 B1* | 9/2016 | Hockey | ................... | G06Q 40/02 |
| 10,051,079 B1* | 8/2018 | Kaukl | ................. | H04L 67/2842 |
| 2002/0036983 A1* | 3/2002 | Widegren | ............... | H04L 12/14 370/230.1 |
| 2002/0133641 A1* | 9/2002 | Royer | ..................... | G06F 21/41 719/329 |
| 2002/0138551 A1* | 9/2002 | Erickson | ................. | H04L 29/06 709/203 |

(Continued)

*Primary Examiner* — Shahriar Zarrineh (57) ABSTRACT

A system is described allowing a user to log into an API proxy by supplying login credentials and to have the API proxy log into the APIs of various web-based applications on behalf of the user by using the user's login credentials, without the user needing to separately log into each application. Calls made by the user to an application and application replies are routed through the API proxy. Further, the API proxy manages session expirations, e.g., by sending dummy calls to applications that exhibit idle expiration.

17 Claims, 4 Drawing Sheets

(56) References Cited

U.S. PATENT DOCUMENTS

| | | | |
|---|---|---|---|
| 2003/0014624 A1* | 1/2003 | Maturana | H04L 29/06 713/151 |
| 2004/0001514 A1* | 1/2004 | Wookey | H04L 63/0428 370/469 |
| 2004/0004942 A1* | 1/2004 | Nebiker | H04M 1/02 370/260 |
| 2004/0062264 A1* | 4/2004 | Adams | H04L 51/36 370/432 |
| 2004/0086102 A1* | 5/2004 | McMurry | H04L 12/66 379/219 |
| 2004/0128393 A1* | 7/2004 | Blakley, III | H04L 63/0807 709/229 |
| 2005/0027818 A1* | 2/2005 | Friedman | H04L 29/06 709/217 |
| 2005/0080906 A1* | 4/2005 | Pedersen | H04L 63/08 709/228 |
| 2005/0141541 A1* | 6/2005 | Cuny | H04L 65/4061 370/437 |
| 2005/0152305 A1* | 7/2005 | Ji | H04L 45/54 370/328 |
| 2005/0261829 A1* | 11/2005 | Furukawa | G01C 21/367 701/414 |
| 2007/0011322 A1* | 1/2007 | Moiso | G06F 9/54 709/225 |
| 2007/0019540 A1* | 1/2007 | Biswas | H04L 29/12094 370/217 |
| 2007/0073817 A1* | 3/2007 | Gorty | G06F 21/33 709/206 |
| 2007/0266135 A1* | 11/2007 | Friedland | H04L 67/14 709/223 |
| 2009/0199276 A1* | 8/2009 | Schneider | H04L 63/0815 726/5 |
| 2009/0260074 A1* | 10/2009 | De Spiegeleer | H04L 29/08846 726/15 |
| 2010/0094985 A1* | 4/2010 | Abu-Samaha | H04L 67/26 709/223 |
| 2010/0146611 A1* | 6/2010 | Kuzin | G06F 21/41 726/8 |
| 2010/0329169 A1* | 12/2010 | de Bruin | H04L 12/1886 370/312 |
| 2012/0110055 A1* | 5/2012 | Van Biljon | G06Q 30/04 709/201 |
| 2012/0154389 A1* | 6/2012 | Bohan | G06F 9/5072 345/419 |
| 2013/0014243 A1* | 1/2013 | Chen | H04L 67/2804 726/8 |
| 2013/0117835 A1* | 5/2013 | Oguma | G06F 21/41 726/8 |
| 2013/0239096 A1* | 9/2013 | Pesarese | G06F 11/3466 717/128 |
| 2013/0308630 A1* | 11/2013 | Alexander | H04L 29/06387 370/352 |
| 2014/0109072 A1* | 4/2014 | Lang | G06F 8/52 717/168 |
| 2014/0157136 A1* | 6/2014 | Bellumio | G06F 3/0484 715/738 |
| 2014/0187236 A1* | 7/2014 | Chiang | H04W 24/04 455/423 |
| 2014/0259147 A1* | 9/2014 | L'Heureux | H04L 63/02 726/14 |
| 2014/0282968 A1* | 9/2014 | Aboughanaima | H04L 63/08 726/7 |
| 2015/0095453 A1* | 4/2015 | Jain | H04L 65/80 709/217 |
| 2015/0188908 A1* | 7/2015 | Akella | H04L 63/0815 726/8 |
| 2015/0312599 A1* | 10/2015 | Brockmann | H04N 21/6125 725/109 |
| 2015/0365491 A1* | 12/2015 | Chan | G06F 17/30085 709/219 |
| 2016/0285858 A1* | 9/2016 | Li | H04L 63/0815 |
| 2016/0301684 A1* | 10/2016 | He | H04L 63/0815 |
| 2016/0352867 A1* | 12/2016 | Subbarayan | H04L 69/16 |
| 2016/0359983 A1* | 12/2016 | Balogh | H04L 67/141 |
| 2017/0093835 A1* | 3/2017 | Whiteside | G06F 21/335 |
| 2017/0264592 A1* | 9/2017 | Yoda | H04L 63/0281 |

* cited by examiner

FIG. 4

PROVIDING A SINGLE SESSION EXPERIENCE ACROSS MULTIPLE APPLICATIONS

CLAIM OF PRIORITY

This application claims priority to and the benefit of U.S. Provisional Application No. 62/187,144, filed Jun. 30, 2015, which is incorporated herein by reference in its entirety.

TECHNICAL FIELD

The present disclosure generally relates to web-based application programming interfaces (APIs) and more specifically to authentication of sessions with web-based APIs.

BACKGROUND

In today's world, individuals rely more and more on web-based services to fulfill various professional as well as personal needs. In the course of a day, an individual may access various online services, such as email, social media, online storage, online banking and others. Similarly, in an enterprise environment, an individual may need to access various enterprise applications on the enterprise network and on the web during the workday. Often, accessing a web-based application requires the user to authenticate her session by logging-in using a login name and a password. For users working with several applications, this can require numerous logins during the course of a day.

Some applications implement "idle expiration", which automatically logs a user out when the user does not correspond with the application for a certain period of time. Idle expiration can be inconvenient to the user if the user is required to repeat a login procedure several times a day. Also, idle expiration can result in loss of user data if the user is halfway through a task when she is logged out.

As mentioned, typically a web-based API requires a user to authenticate a session (i.e., provide the user's identity to the API) by entering an initial set of login credentials, such as a password and a login name. In exchange for the login credentials, the API then sends a session key, which may be a random alphanumeric sequence held by a client application on the user's device, such as a web browser. The server hosting the application remembers the random sequence and associates it with the user identity.

Subsequently, the client application supplies the session key with every call made to the API to authenticate the user. The server matches the received session key against all kept session keys and obtains the user data corresponding to the received session key.

Upon completion of the interaction (e.g., when the user elects to log-out), the client application asks the server to log out of the session. The server then removes the session key and associated user identity from its memory, thus preventing any further calls with that session ID.

In addition, many server implementations implement expiration for the session keys where the validity of a session key is terminated after a certain period of time. Some servers implement idle expiration, as mentioned above, where when a given session key is not used for a certain period of time, the server automatically terminates its validity. This type of expiration is implemented to minimize the risks of attackers stealing session keys and performing operations on behalf of the original user. Some servers implement a maximum session lifespan, where a session key is set to expire a fixed interval of time after login. This type of expiration is set to reduce the risk of attackers guessing the session key of long-running user sessions.

When a user is involved with multiple applications, she may need to perform the login procedures for each application and be additionally burdened with expiration constraints.

Numerous efforts have been made to simplify the experience of authenticating multiple services. The public standards to date focus on having end users authenticate manually at a single application that then creates tokens to be used for secondary authentication with various other applications. Examples of this include SAML, OAuth, OAuth2, and OpenID standards. With these standards, credentials are created by an initial application that verifies the end user identity and the credentials are then used to generate session keys for each accessed server hosting other applications. Thus, the problem of maintaining multiple session keys and respecting multiple session key expiration policies is not solved.

Other solutions provide single session keys that are used across multiple applications. However, those solutions typically impose implementation constraints on the servers, which requires substantial modifications. One such approach, popular with software as a service (SaaS) companies, is a shared session manager. In this scenario, a single repository of session keys and associated data is shared between all servers. This requires that all servers have a fast and secure connection to this common repository, is hard to scale, and is useful when the individual server applications are developed and deployed together by the same organization.

Another known approach is to encode the user identity in the session key. In this approach, the user identity is encoded in the session key itself and is protected cryptographically against forgery. Upon receipt of such a token, the server implementation checks the integrity of the token using cryptographic techniques and obtains the user data from the session key, which is further used by the implementation. An example of such a standard is JWT (JSON Web Token). While this approach has some advantages, it requires server-side modifications to implement JWT, which is not always feasible.

A more efficient approach is desirable for providing a single session experience across multiple applications that cannot share common session management, which does not require the user to log into each application separately and takes into account expiration policies of the multiple applications.

DETAILED DESCRIPTION

Systems and methods in accordance with various embodiments of the present disclosure overcome at least some of the above mentioned shortcomings and deficiencies by providing more efficient ways to create a single session experience across multiple web-based applications that cannot share common session management. In particular, embodiments described herein leverage an application programming interface (API) proxy that provides a single location where a user logs in through a client application and automatically initiates sessions with APIs of applications that the user may desire to access without requiring the user to log into each application separately, while managing session expirations on all the application sessions on behalf of the client.

In various embodiments, a user can log into an API proxy via a client application, such as a web browser, that runs on the user's client device. The user enters her login credentials, such as a user name and password into the client device which provides those credentials to the API proxy to initiate a session with the API proxy. Once the session with the API proxy is established, the API proxy initiates sessions with other web-based applications on behalf of the client device by forwarding the user's login credentials to the APIs of the applications. The sessions with the applications are associated with the client device by the API proxy such that calls from the client device that are targeted to a particular application can be conveyed by the API proxy to the corresponding application's API and, conversely, replies and messages from an application can be forwarded to the client device by the API proxy.

When the client device makes a call to an application, the call is made through the API proxy. The API proxy receives the call and forwards the call to the corresponding application via the active session that the API proxy has with the application. If the application sends a reply or a message to the API proxy that is targeted to the client device, the API proxy receives the reply or message and conveys it to the client device. Further, the API proxy manages the sessions according to the different session expiration policies of the multiple applications on behalf of the client. For example, for applications that employ idle expiration, the API proxy can send dummy signals to prevent the applications from terminating the session. Also, if a session expires or otherwise terminates, the API proxy can re-establish the session and obtain a new session key on behalf of the client, without the user having to re-enter her login information.

As a result, a user is able to supply her login credentials once at the API proxy and initiate sessions with several applications that may utilize different session expiration policies by having the API proxy log in to those applications on behalf of the user's client device. Further, when the user terminates her session with the API proxy, e.g., by logging out, the API proxy can terminate sessions with all applications.

Figure 1:
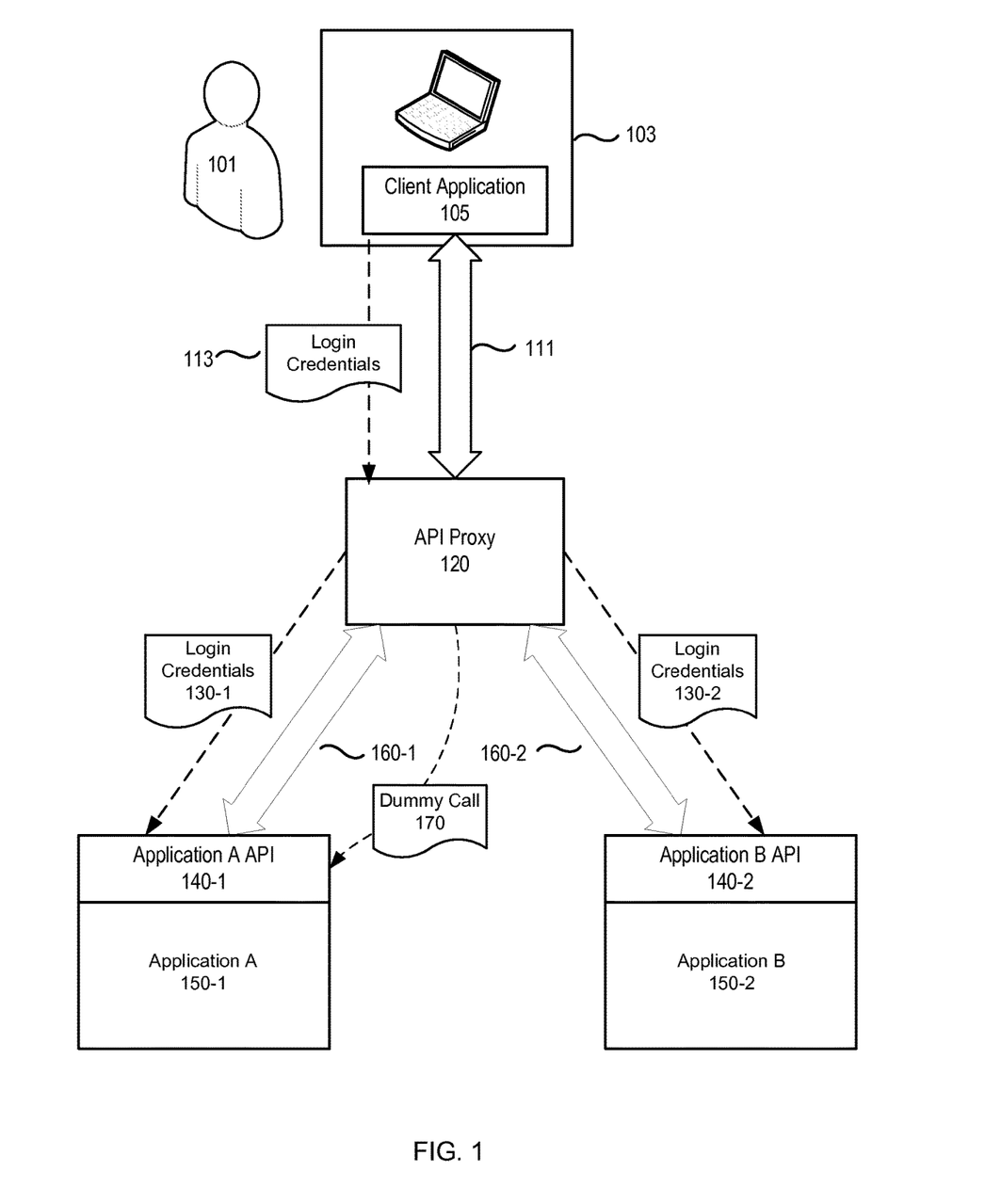
FIG. 1 illustrates an example architecture of a system for single session experience across multiple applications.

FIG. 1 illustrates an example architecture of a system for single session experience across multiple applications. As illustrated in the example of FIG. 1, a user 101 operates a client device 103. A client application 105 runs on the client device. The client device 103 can be any computing device such as a laptop, desktop, tablet, smartphone, and so on. The client application 105 can be any application capable of initiating and providing a session between the client device 103 and a web-based application running on a remote server. For example, the client application 105 can be a web browser such as Internet Explorer, Google Chrome, Firefox, and so on.

The user 101 can log into an API proxy 120 via the client application 105 by supplying login credentials 113 to the API proxy 120. In various embodiments, the API proxy 120 can be an application running on a remote server. For example, the API proxy 120 login may be accessible through a browser on the client device 103 at a specific internet IP address (e.g., http://api.api_proxy.com/login).

The client device 103 and the API proxy 120 can communicate via a network, such as the Internet, a local area network (LAN), a wide area network (WAN), or any other network capable of providing a communication channel.

In various embodiments, login credentials 113 can be any set of data that is able to uniquely identify the user 101 to the API proxy 120. Once the API proxy 120 confirms the login credentials 113, a session 111 between the client device 103 and the API proxy 120 is initiated.

For example, the login credentials 113 can be a user name and a password. The user name and password can be conveyed to the API proxy 120 and, after the user name and password are confirmed, a session key, which can be a random alphanumeric sequence, can be generated in the API proxy 120 and sent to the client application 105, where the session key can be stored. Subsequently, calls to the API proxy from the client application 105 are accompanied with the session key to authenticate the calls. Accordingly, as long as the session key remains active, the session 111 remains valid. To terminate the session, the API proxy can delete or invalidate the session key. The implementation of the system with session keys will be covered in greater detail in FIG. 2.

In other embodiments, different mechanisms can be used to provide authenticated sessions between the client application 105 and the API proxy 120. For example, sessions can be authenticated using Security Assertion Markup Language (SAML) Holder of Key tokens and corresponding public and private keys. The use of SAML Holder of Key tokens for session authentication will be described in greater detail below.

After the session 111 with the API proxy 120 is initiated, the API proxy 120 can establish sessions with web-based applications (e.g., Application A 150-1, Application B 150-2) on behalf of the client device 103. In various embodiments, each application (e.g., 150-1, 150-2) can be located on a separate remote server, which is communicatively linked to the API proxy 120 via a network. In other embodiments, all or some applications (e.g., 150-1, 150-2) can be co-hosted on the same server or may reside on the same local area network (LAN) as the API proxy. For example, an application can be an email client such as Gmail, a social website such as Facebook, an online database such as Dropbox, and so on. Similarly, when deployed in an enterprise, the applications can be any web- or network-hosted services that are used by employees of the enterprise. It should be noted that while the example of FIG. 1 illustrates two applications, (e.g., 150-1, 150-2), a real world implementation would generally include several applications as well as other system components, which are not illustrated here so as not to obscure the salient parts of the invention. Also, in various embodiments, a single API proxy (e.g., 120) can serve numerous client devices other than client device 103.

To establish a session 160-1 with Application A 150-1, the API proxy 120 forwards the user's 101 login credentials 130-1 to the API of Application A 140-1. Once the application A API 140-1 verifies the login credentials 130-1, the session 160-1 is initiated. Similarly, to establish a session 160-2 with Application B 150-2, the API proxy 120 forwards the user's 101 login credentials 130-2 to the API of Application B 140-2. Once the application B API 140-2 verifies the login credentials 130-2, the session 160-2 is initiated.

In various embodiments, sessions can be initiated by the API proxy 120 with an application (e.g., 150-1, 150-2) when the user 101 (through the client application 105) attempts to access those applications. For example, application A 150-1 may be accessible through a browser on the client device 103 at a specific address directing through the API proxy 120 (e.g., http://api.api_proxy.com/application_A). When the API proxy 120 detects that the client application 105 is attempting to access an application (e.g., 150-1, 150-2) with which the API proxy 120 does not have an active session, the API proxy 120 can send login credentials (e.g., 130-1, 130-2) to the API (e.g., 140-1, 140-2) of the application (e.g., 150-1, 150-2) to initiate a session (e.g., 160-1, 160-2).

In other embodiments, the API proxy 120 can be configured to initiate sessions (e.g., 160-1, 160-2) with applications (e.g., 150-1, 150-2) as soon as the client application 105 establishes a session 111 with the API proxy 120. For example, the API proxy 120 can be configured to immediately initiate sessions with a predetermined set of applications (e.g., 150-1, 150-2) as soon as the user logs into the API proxy 120. In various embodiments, after the API proxy 120 initiates sessions with such a predetermined set of applications, sessions with other applications can be initiated when the client application 105 requests access to such applications (e.g., 150-1, 150-2).

Generally, because the API proxy 120 sends login credentials (e.g., 130-1, 130-2) to various application APIs (e.g., 140-1, 140-2), the system must be configured to ensure that the login credentials (e.g., 130-1, 130-2) are compatible with the various application APIs (e.g., 140-1, 140-2). For example, when the credentials (e.g., 130-1, 130-2) that are acceptable to the application APIs (e.g., 140-1, 140-2) are the same as the credentials 113 that are acceptable to the API proxy 120, the credentials 113 received from the client application 105 by the API proxy 120 can be forwarded directly to the application APIs (e.g., 140-1, 140-2) to log in to the corresponding applications (e.g., 150-1, 150-2). In other embodiments, for example when some of the application APIs (e.g., 140-1, 140-2) have different log-in requirements than others, credentials 113 can be transformed so that they are compatible and can be used with the particular application APIs (e.g., 140-1, 140-2) to allow the API proxy 120 to authenticate the session on behalf of the original client device with each of the application APIs (e.g., 140-1, 140-2). For example, Holder of Key SAML tokens can be exchanged with Act-As tokens that allow the API proxy 120 to authenticate a session (e.g., 160-1, 160-2) on behalf of the client application 105.

After the session 113 with the API proxy and sessions 160-1, 160-2 with each application 150-1, 150-2 are initiated, the client application 105 can make a call to an application (e.g., 150-1, 150-2) through the API proxy 120. Namely, the client application 105 accesses an application (e.g., 150-1, 150-2) indirectly via the API proxy 120. Hence, client application 105 makes a call targeted to an application (e.g., 150-1, 150-2) to the API proxy 120 through session 111 with the API proxy. The API proxy 120 in turn forwards the call to the application API (e.g., 140-1, 140-2) through a corresponding session (e.g., 160-1, 160-2). Consequently, when an application (e.g., 150-1, 150-2) sends a response targeted for the client application 105, the response is sent to the API proxy 120 through the corresponding session (e.g., 160-1, 160-2). From the API proxy 120, the response is then sent to the client application 105 via session 111.

In various embodiments, the API proxy 120 can maintain each session 160-01, 160-2 according to the expiration policy of the corresponding application 150-1, 150-2. Namely, each application 150-1, 150-2 may employ a different expiration policy, such as a different idle expiration policy, a different maximum life, different requirements to prevent expiration, and so on. Thus, the API proxy 120 can be configured to maintain or manage each application (e.g., 150-1, 150-2) according to the specific requirements of the application's (e.g., 150-1, 150-2) expiration policy. For example, the API proxy 120 can establish a first session 160-1 with a first application 150-2, which employs a first session expiration policy, and a second session 160-2 with a second application, which employs a second session expiration policy that is different from the first session expiration policy. Subsequently, the API proxy 120 can maintain the first session 160-1 according to the first expiration policy and the second session 160-2 according to the second expiration policy on behalf of the client device.

The API proxy 120 can use various techniques to maintain sessions (e.g., 160-1, 160-2) according to their corresponding expiration policies. In various embodiments, to prevent idle expiration of sessions (e.g., 160-1, 160-2), the API proxy 120 can send periodic dummy calls to an application (e.g., 150-1, 150-2). For example, the API proxy 120 can be configured to send dummy calls 170 at a predetermined frequency, such as once every 10 minutes. The dummy calls 170 can be any call to the application 150-1 that prevents the session 160-1 from expiring. Preferably, the dummy calls 170 alter as little as possible in the application 150-1 and primarily result in an indication to the application 150-1 that the user 101 is active to prevent session expiration.

At least for the reason that dummy calls 170 consume system resources, the API proxy 120 can be configured to send dummy calls 170 only to certain applications (e.g., 150-1, 150-2). For example, dummy calls 170 can be sent to applications that provide a "state-full session experience". As used herein, "state-full session experience" refers to application implementations that associate additional information with the session and change API behavior. Such additional data may be things like shopping basket content, partially created objects (such as partially written emails), etc. Idle expiration of a session involving a state-full experience can be problematic because it can result in user inconvenience or loss of user data, such as loss of a partially written email in an email application, loss of contents of a shopping cart in an online store application, etc. Accordingly, it can be advantageous to send dummy calls to applications that provide a state-full session experience.

In various embodiments, if a session (e.g., 160-1, 160-2) between the API proxy 120 and an application (e.g., 150-1, 150-2) terminates, the API proxy 120 may observe an error, such as an authentication error, when attempting to make a call to the application (e.g., 150-1, 150-2). In this situation, the API proxy 120 can send login credentials (e.g., 130-1, 130-2) to the application API (e.g., 140-1, 140-2) to log in again and re-establish the session (e.g., 160-1, 160-2). The entire process may be transparent to the user. Accordingly, sessions (e.g., 160-1, 160-2) that terminate due to idle expiration or any other reasons may be automatically re-initiated by the API proxy 120 when needed. Consequently, sending dummy calls (e.g., 170) to applications (e.g., 150-1, 150-2) that do not exhibit state-full session experience may not be necessary, as the system can automatically re-initiate a session (e.g., 160-1, 160-2) if a user 101 makes a call to the application (e.g., 150-1, 150-2) after the session (e.g., 160-1, 160-2) has expired.

As mentioned above, many applications (e.g., 160-1, 160-2) exhibit a maximum session lifespan, meaning that a session is set to expire a fixed interval of time (e.g., 24 hours) after login. This type of limit is set to reduce the risk of attackers guessing the session key of long-running user sessions. For example, an attacker could attempt syncing random session key generation algorithms and look for collision with active sessions. In various embodiments, it may be desirable to respect such maximum session lifespan of applications (e.g., 150-1, 150-2), for example, to support security. Accordingly, the API proxy 120 can be configured to have a stricter (e.g., shorter) maximum session lifespan than any application (e.g., 150-1, 150-2). Thus, the API proxy 120 can be configured to terminate a session after a fixed period of time, such as 24 hours.

In various embodiments, when the user's session with the API proxy 120 is terminated (e.g., due to user logging out, expiration, etc.) the API proxy 120 logs out of all active sessions (e.g., 160-1, 160-2).

Figure 2:
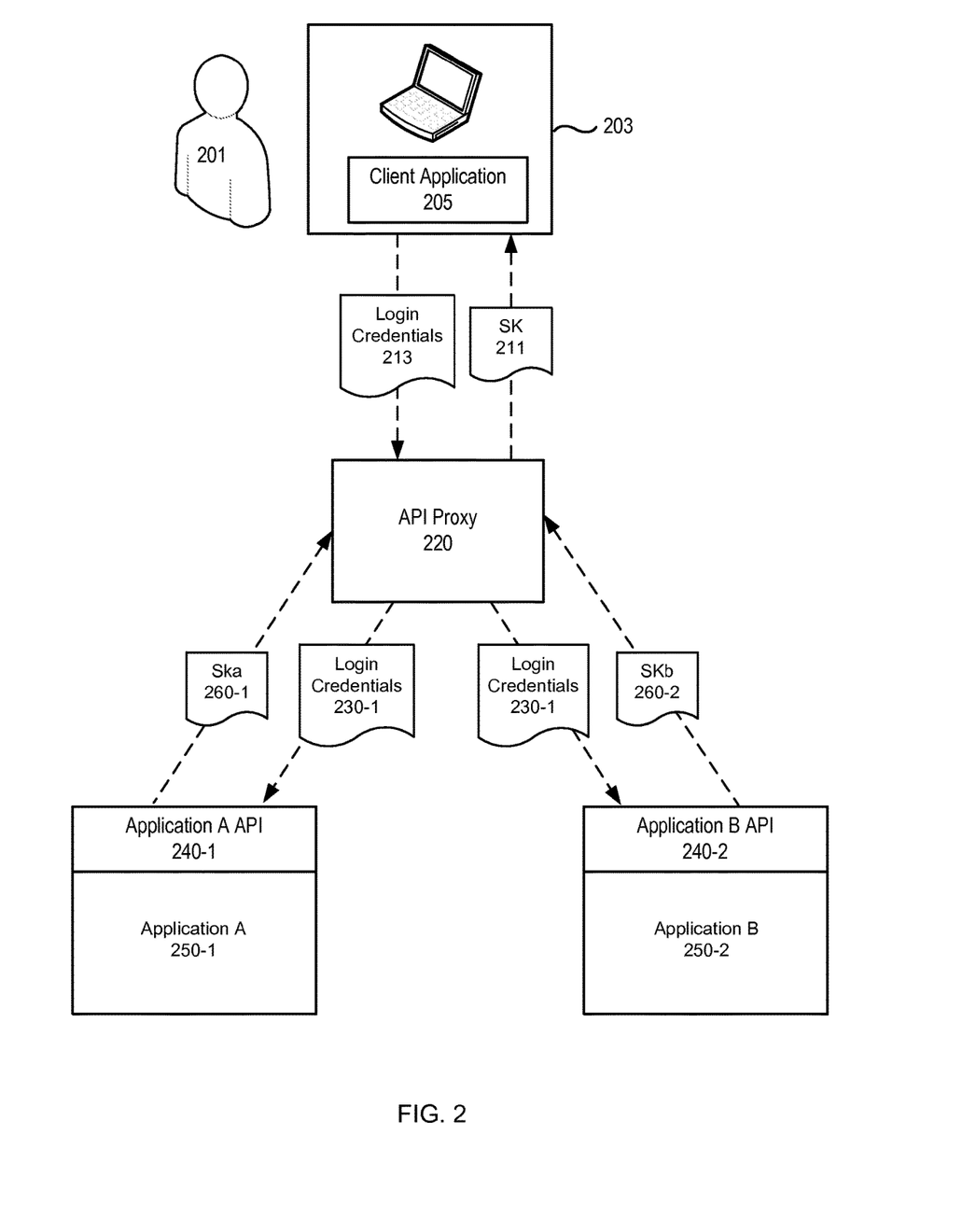
FIG. 2 illustrates an example architecture of a system for single session experience across multiple applications implementing session keys.

FIG. 2 illustrates an example architecture of a system for single session experience across multiple applications implementing session keys. It should be noted that the architecture described in FIG. 2 is an example of an architecture that can be implemented by the system, such as the system described in FIG. 1, to enable sessions based on session keys. In other embodiments, other methods of enabling sessions can be used, such as with Holder of Key SAML tokens. As illustrated in the example of FIG. 2, a user 201 operates a client device 203. A client application 205, such as a browser, runs on the client device. The user 201 can log into an API proxy 220 via the client application 205 by supplying login credentials 213, such as a user name and a password, to the API proxy 220.

Once the API proxy 220 confirms the login credentials 213, the API proxy 220 sends a proxy session key (SK) 211 in exchange for the login credentials 213, which can be a randomly generated alphanumeric sequence, back to the client application 205, where session key SK 211 can be stored. As long as session key SK 211 remains valid with the API proxy 220, the session between the client application 205 and the API proxy is active. Accordingly, the client application 205 is able to communicate with the API proxy 220 by sending calls that are accompanied by session key SK 211. When the API proxy 220 receives a call from the client application 205, as long as the session key SK 211 is valid, the call can be authorized and associated with the client application 205. When the session needs to be terminated, e.g., due to user 101 logging out or expiration, the session key SK 211 can be invalidated or deleted at the API proxy 220 to terminate the session.

After the session with the API proxy 220 is initiated, the API proxy 220 can establish sessions with web-based applications (e.g., Application A 250-1, Application B 250-2) on behalf of the client device 203. For example, to establish a session with Application A 250-1, the API proxy 220 forwards the user's 201 login credentials 230-1 to the API 240-1 of Application A 250-1. Once application A API 240-1 verifies the login credentials 230-1, the application A API 240-1 sends a session key (SKa) 260-1 in exchange for the login credentials 230-1, which can be a randomly generated alphanumeric sequence, back to the API proxy 220, where session key SKa 260-1 can be stored. As long as session key SKa 260-1 remain valid, the session between application A 250-1 and the API proxy 220 is active. Accordingly, the API proxy 220 is able to communicate with application A 250-1 by sending calls that are accompanied by session key SKa 260-1. When application A 250-1 receives a call from the API proxy 220, as long as the session key SKa 260-1 is valid, the call will be authorized and associated with the API proxy 220. When the session needs to be terminated, e.g., due to a log out request, idle expiration, or when reaching maximum session lifespan, the session key SK 260-1 can be invalidated or deleted at application A 250-1 to terminate the session.

Similarly, to establish a session with Application B 250-2, the API proxy 220 forwards the user's 201 login credentials 230-2 to the API 240-2 of Application B 250-2. Once the application B API 240-2 verifies the login credentials 230-2, a session key (SKb) 260-2 is generated and sent back to the API proxy 220 to initiate the session.

In various embodiments, to enable the client application 205 to communicate with the applications 250-1 and 250-2 through the API proxy 220, the API proxy 220 associates the session keys SKa 260-1 and SKb 260-2 with the session key SK 211. Consequently, when a call to an application 250-1 or 250-2 is made through the API proxy 220, the API proxy 220 finds the corresponding session key (SKa 260-1 or SKb 260-2) based on the session key SK 211 supplied by the client application 205 and the required operation.

For example, the client application 205 may make a call to the API proxy 220 that is targeted for application A 250-1. Because the call is being made by the client device 205 to the API proxy 220 during a session, the call will be accompanied by session key SK 211 in order to authorize the call with the API proxy 220. When the API proxy 220 receives the call, based on the session key SK 211 and based on the information that the call is targeted to application A 250-1, the API proxy 220 can retrieve the session key SKa 260-1, join it to the call, and forward the call with the session key SKa 260-1 to the application A API 240-1. Consequently, when a reply is sent by application A 250-1, the reply can be received by the API proxy 220 and forwarded to the client application 205.

In various embodiments, when the client application 205 session is terminated (e.g., by the user logging out, due to session expiration, etc.), the API proxy 220 can request to terminate sessions with all applications (e.g., A 250-1 and B 250-2), which can consequently invalidate or delete the session keys (e.g., SKa 260-1 and SKb 260-2) to terminate the corresponding sessions.

Figure 3:
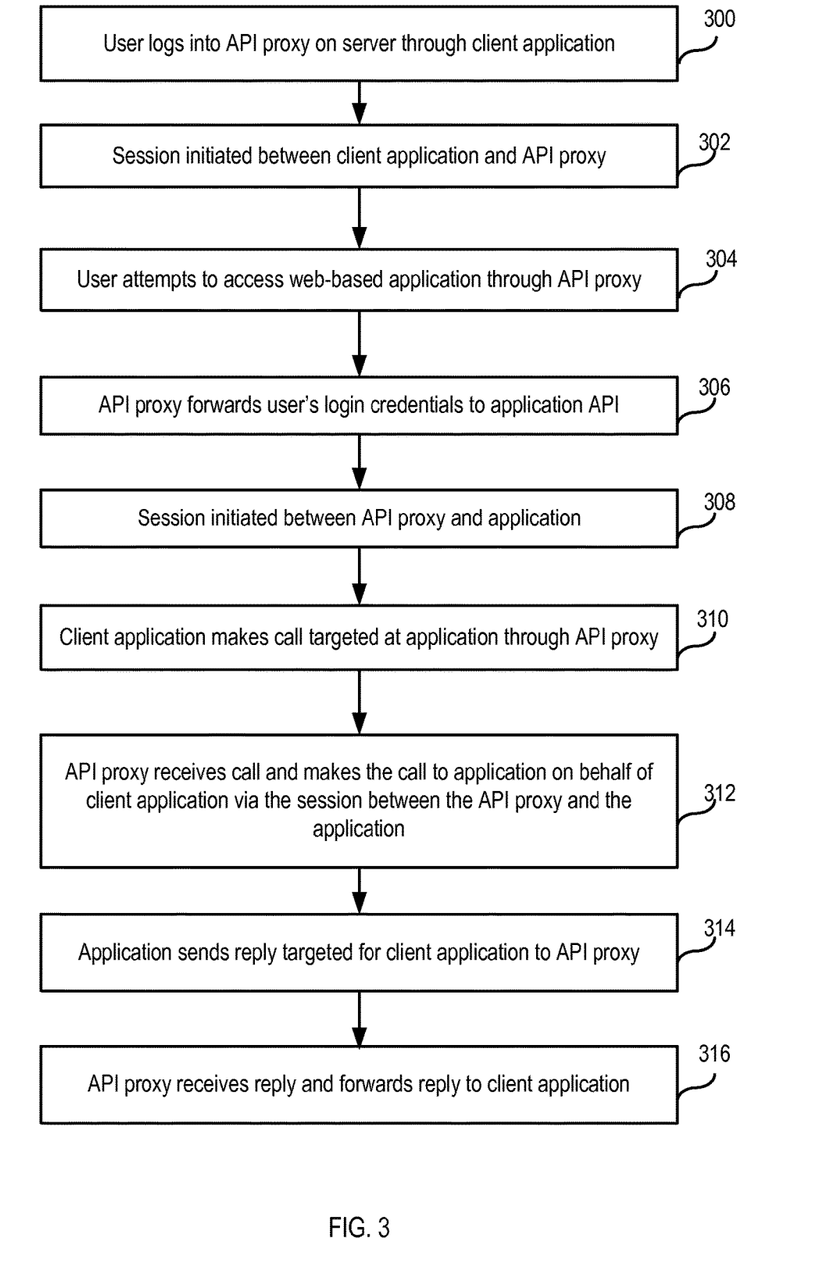
FIG. 3 illustrates an example of a process for single session experience across multiple applications.

FIG. 3 illustrates an example of a process for single session experience across multiple applications. In operation 300, a user logs into an API proxy, located on a remote server, through a client application, such as a web browser, on the user's client device by supplying the user's login credentials to the API proxy. In operation 302, the session between the client application and the API proxy is initiated after the user's credentials are verified. In operation 304, the user attempts to access a web-based application through the API proxy. Upon detecting the attempted access, the API proxy forwards the user's login credentials to the application API in operation 306. Once the user credentials are verified by the application API, the session between the API proxy and the application is initiated in operation 308. Subsequently, in operation 310, the client application makes a call targeted at the application through the API proxy. In operation 312, the API proxy receives the call and makes the call to the application on behalf of the client application via the session between the API proxy and the application. In operation 314, the application sends a reply targeted for the client application to the API proxy. The API proxy receives the reply and forwards the reply to the client application in operation 316.

As mentioned above, in various embodiments, sessions can be authenticated using Security Assertion Markup Language (SAML) Holder of Key tokens, which is based on Public Key cryptography. Public Key Cryptography is a class of cryptographic algorithms that requires two separate keys. Message encrypted with one of the keys can be decrypted only with the other key. One of the keys is designated as public and shared with all parties that want to exchange information with a given person (Alice). The other key is designated as private and only Alice can use it to decrypt incoming messages or encrypt outgoing messages.

In Public Key Cryptography there are two possible use cases:

1. Encryption—When a person (Bob) wants to send a message to Alice, he will use Alice's public key to encrypt the message before sending. Since only Alice knows the corresponding private key, she is the only one who can decrypt the message and read it.

2. Digital Signature—When Alice wants to send a message to Bob and allow Bob to verify that the message comes from Alice and no one else, Alice can encrypt the message with her private key. Upon receipt, Bob will be able to decrypt the message with the public key and thus know it is authentic and originates from Alice.

If both Bob and Alice have public and private keys, they can use them combined to both encrypt and digitally sign their communications. For example, Bob can encrypt the message with his private key to let Alice know he is the sender and can further encrypt the message with Alice's public key to make sure only she can decrypt and read it.

Public Key Cryptography is used to establish trusted third parties that can confirm the identities of people and support a system of trust. Suppose Trent is a well-known third party whom both Alice and Bob trust. Thus both Alice and Bob have Trent's public key. If Bob wants to send a message to Alice but does not know her public key, he can ask Trent for it. Trent will digitally sign Alice's public key using his private key and send it to Bob. Bob will decrypt Alice's public key using the public key of Trent, thus verifying its authenticity. Subsequently Bob can use Alice's public key to encrypt the message, making sure no one else can read it.

A similar set up can be used to allow Alice to verify Bob is the sender of the message even if Alice has no access to Bob's public key. The steps in this scenario are:
1. Alice knows Trent's public key and trusts him;
2. Trend knows Bob's public key and has verified his identity (e.g. his driving license);
3. Trent creates a certificate for Bob. A certificate is a document protected with Trent's private key that includes Bob's personal details and public key;
4. Bob encrypts the message with his private key and appends the certificate to the message;
5. Alice receives the message. She can decrypt the certificate using Trent's public key. From the certificate, Alice obtains the public key of Bob and his personal data. Subsequently Alice can decrypt the message from Bob using his public key and thus know Bob is the original sender of the message.

The above described certificate infrastructure is essential to security on the Internet and is used by web sites, email etc. to provide secure access. The above is often referred to a Public Key Infrastructure (PKI)

Security Assertion Markup Language (SAML) is a standard for exchanging security related authentication and authorization information. In essence, it allows a web user to login once with their credentials (username and password, smartcard, token, etc.) in a centralized authentication system and use various web-based services without entering the user's credentials at every service.

A typical scenario for SAML is as follows:
1. Alice is an employee of a big corporation, Acme. In her everyday work, she has to use various information systems—accounting, payroll, vacations, etc. Acme wants to keep its operation secure and has implemented SAML-based authentication by deploying a Secure Token Service (STS) alongside their corporate directory system.

2. The STS is trusted by all applications within Acme. Trusted means that all applications have the STS public key and can verify that certain messages originate from the STS server.

3. Every day when Alice comes to work she would go to the STS and supply her credentials (username and password). STS would in exchange give Alice an authentication token. An authentication token is similar to a certificate—it contains the user data of Alice, expiration time and optionally a public key (as described further below). The authentication token is protected with the STS private key, so that various services can verify that the authentication token is issued by the STS.

4. Alice can use the authentication token to verify her identity against all services at Acme. She would send the authentication token to the applications instead of her username password and obtain access until a certain time marked in the token lapses.

To achieve the above scenario, SAML makes use of Public Key Cryptography that builds on top of the certificate infrastructure. Depending on the desired security level Acme and/or Alice can select between Bearer and Holder-of-Key, among other algorithms.

A Bearer assertion is the simplest way to use authentication tokens. In essence, STS handover to the client a document/token that the client has to present to various services unmodified, to authenticate. The token itself is a digitally signed by STS XML document that contains the user details and an expiration timestamp. The problem with bearer tokens is that they can be stolen by a malicious party and reused to authenticate against arbitrary other services.

To overcome the security limitations of the bearer tokens and introduce a higher level of security, the SAML standard describes Holder-of-Key assertion that utilizes public key cryptography to protect against theft of the token by malicious users. The basic sequence for issuing a Holder-of-Key token is as follows:
1. The client generates new public and private keys
2. Client sends the public key along with the Client's credentials (username and password) to STS
3. STS issues a digitally signed token that contains the user details and the public key from step 1.

When authenticating to a service using the token, the Client sends a document that includes: the token issued by STS, a random number, and the name of the accessed service. All of this is protected with the private key generated in step 1 above.

The accessed service extracts the token and the public key from it. With the public key, the service verifies that
1. the whole message was indeed composed by the client.
2. the included random number has not been sent before
3. the service name matches its name
4. the token is signed by an STS trusted by the service Thus, using Holder-of-Key, it is impossible for an attacker to reuse the authentication message and the security of communication is vastly improved. The downside of the Holder-of-Key scheme is cryptographic complexity. Thus, in most contemporary systems, bearer tokens are used over encrypted connections, thereby reducing the risk of an attacker stealing the authentication token.

Figure 4:
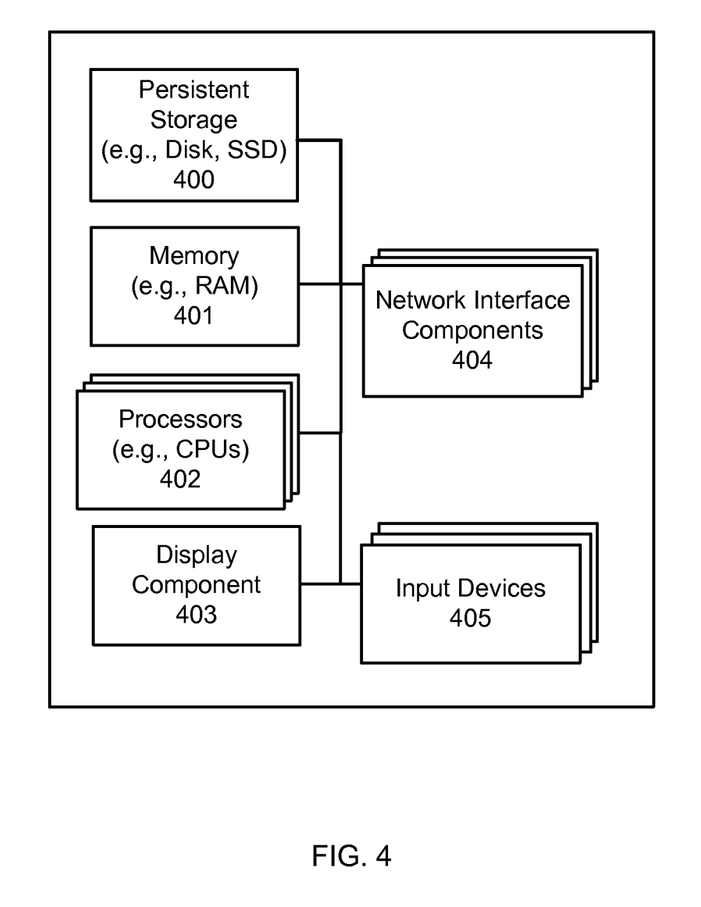
FIG. 4 illustrates an example of some general components of a computing device that can be utilized in conjunction with various embodiments described in the present specification.

FIG. 4 illustrates an example of some general components of a computing device that can be utilized in conjunction with various embodiments described in the present specification. In this particular example, the computing device includes one or more processors (e.g., central processing units (CPUs) 402 for executing instructions that can be stored in a storage medium. The storage medium may take the form of memory 401 (e.g., RAM), persistent storage 400 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 402, a separate form of storage for images or data, a removable memory for sharing information with other devices and the like.

The computing device typically further comprises a display component 403, such as a computer monitor, a touch screen, liquid crystal display (LCD), light-emitting diode (LED) display, or the like. The display component 403 is conventionally used to display images or information to the user so that the user may interact with the computing device. In various embodiments, the computing device will also include a set of input devices 405 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
 receiving, at an application programming interface (API) proxy, a user's login credentials from a client device, the API proxy being an application configured to initiate sessions on behalf of the user with each application in a predetermined set of applications that are hosted on one or more remote servers;

authenticating the user at the API proxy based on the received login credentials and initiating a user session between the client device and the API proxy;

conveying the user's login credentials for a first application in the predetermined set of applications from the API proxy to an API of the first application to authenticate the user and initiate a first session between the API proxy and the first application on behalf of the client device;

enabling interaction with the first application on the client device via the API proxy by:

receiving at the API proxy a request from the client device, the request being targeted to the API of the first application;

conveying the request from the API proxy to the API of the first application and receiving a response to the request at the API proxy;

forwarding the response to the client device;

wherein the API proxy is configured to send dummy calls to prevent idle expiration of applications that provide a state-full session experience, and to not send dummy calls to applications that do not provide a state-full session experience, wherein an application provides a state-full session experience if it associates additional user data with a session, which user data is lost if the session is logged out;

wherein initiating the session between the client device and the API proxy further comprises, in exchange for the login credentials received at the API proxy, receiving an API proxy session key at the client device from the API proxy, wherein the API proxy session key is an alphanumeric sequence, and wherein the API proxy session key is included in calls from the client device to the API proxy to authenticate the calls; and wherein initiating the first session between the API proxy and the first application further comprises, in exchange for the login credentials received at the API of the first application, receiving at the API proxy a corresponding application session key from the first application, wherein the corresponding application session key is an alphanumeric sequence, and wherein the corresponding application session key is included in calls from the API proxy to the API of the first application to authenticate the calls.

2. The method of claim 1, wherein the first application employs a first session expiration policy, further comprising:

establishing a second session between the API proxy and a second application in the predetermined set of applications, wherein the second application employs a second session expiration policy that is different from the first session expiration policy; and maintaining the first session according to the first expiration policy and the second session according to the second expiration policy by the API proxy on behalf of the client device.

3. The method of claim 1, further comprising, prior to conveying the login credentials from the API proxy to the API of the first application, transforming the login credentials to allow the API proxy to authenticate the session on behalf of the client device.

4. The method of claim 1, wherein the login credentials received from the client device is a Security Assertion Markup Language (SAML) Holder of Key token.

5. The method of claim 1, further comprising:

in response to the request conveyed from the API proxy to the API of the first application, receiving an error due to the session with the first application being terminated; and re-establishing the session by conveying the login credentials to the API of the first application.

6. A computing device, comprising:

at least one processor; and memory including instructions that, when executed by the at least one processor, cause the computing device to:

receive, at an application programming interface (API) proxy, a user's login credentials from a client device, the API proxy being an application configured to initiate sessions on behalf of the user with each application in a predetermined set of applications that are hosted on one or more remote servers;

authenticate the user at the API proxy based on the received login credentials and initiate a user session between the client device and the API proxy;

convey the user's login credentials for a first application in the predetermined set of applications from the API proxy to an API of the first application to authenticate the user and initiate a first session between the API proxy and the first application on behalf of the client device;

enable interaction with the first application on the client device via the API proxy by:

receiving at the API proxy a request from the client device, the request being targeted to the API of the first application;

conveying the request from the API proxy to the API of the first application and receiving a response to the request at the API proxy;

forwarding the response to the client device;

wherein the API proxy is configured to send dummy calls to prevent idle expiration of applications that provide a state-full session experience, and to not send dummy calls to applications that do not provide a state-full session experience, wherein an application provides a state-full session experience if it associates additional user data with a session, which user data is lost if the session is logged out;

wherein initiating the session between the client device and the API proxy further comprises, in exchange for the login credentials received at the API proxy, receiving an API proxy session key at the client device from the API proxy, wherein the API proxy session key is an alphanumeric sequence, and wherein the API proxy session key is included in calls from the client device to the API proxy to authenticate the calls; and wherein initiating the first session between the API proxy and the first application further comprises, in exchange for the login credentials received at the API of the first application, receiving at the API proxy a corresponding application session key from the first application, wherein the corresponding application session key is an alphanumeric sequence, and wherein the corresponding application session key is included in calls from the API proxy to the API of the first application to authenticate the calls.

7. The computing device of claim 6, wherein the first application employs a first session expiration policy, and wherein the memory further includes instructions that when executed by the at least one processor, cause the computing device to:

establish a second session between the API proxy and a second application in the predetermined set of applications, wherein the second application employs a second session expiration policy that is different from the first session expiration policy; and maintain the first session according to the first expiration policy and the second session according to the second expiration policy by the API proxy on behalf of the client device.

8. The computing device of claim 6, wherein the memory further includes instructions that when executed by the at least one processor, cause the computing device to:

prior to conveying the login credentials from the API proxy to the API of the first application, transform the login credentials to allow the API proxy to authenticate the session on behalf of the original client device.

9. The computing device of claim 6, wherein the login credentials received from the client device is a Security Assertion Markup Language (SAML) Holder of Key token.

10. The computing device of claim 6, wherein the memory further includes instructions that when executed by the at least one processor, cause the computing device to:

in response to the request conveyed from the API proxy to the API of the first application, receive an error due to the session with the first application being terminated; and re-establish the session by conveying the login credentials to the API of the first application.

11. A non-transitory computer readable storage medium comprising one or more sequences of instructions, the instructions when executed by one or more processors causing the one or more processors to execute the operations of:

receiving, at an application programming interface (API) proxy, a user's login credentials from a client device, the API proxy being an application configured to initiate sessions on behalf of the user with each application in a predetermined set of applications that are hosted on one or more remote servers;

authenticating the user at the API proxy based on the received login credentials and initiating a user session between the client device and the API proxy;

conveying the user's login credentials for a first application in the predetermined set of applications from the API proxy to an API of the first application to authenticate the user and initiate a first session between the API proxy and the first application on behalf of the client device;

enabling interaction with the first application on the client device via the API proxy by:

receiving at the API proxy a request from the client device, the request being targeted to the API of the first application;

conveying the request from the API proxy to the API of the first application and receiving a response to the request at the API proxy;

forwarding the response to the client device;

wherein the API proxy is configured to send dummy calls to prevent idle expiration of applications that provide a state-full session experience, and to not send dummy calls to applications that do not provide a state-full session experience, wherein an application provides a state-full session experience if it associates only to applications that associate additional user data with a session, which user data is lost if the session is logged out;

wherein initiating the session between the client device and the API proxy further comprises, in exchange for the login credentials received at the API proxy, receiving an API proxy session key at the client device from the API proxy, wherein the API proxy session key is an alphanumeric sequence, and wherein the API proxy session key is included in calls from the client device to the API proxy to authenticate the calls; and wherein initiating the first session between the API proxy and the first application further comprises, in exchange for the login credentials received at the API of the first application, receiving at the API proxy a corresponding application session key from the first application, wherein the corresponding application session key is an alphanumeric sequence, and wherein the corresponding application session key is included in calls from the API proxy to the API of the first application to authenticate the calls.

12. The non-transitory computer readable storage medium of claim 11, wherein the first application employs a first session expiration policy, further comprising instructions to cause the one or more processors to execute the operations of:

establishing a second session between the API proxy and a second application in the predetermined set of applications, wherein the second application employs a second session expiration policy that is different from the first session expiration policy; and maintaining the first session according to the first expiration policy and the second session according to the second expiration policy by the API proxy on behalf of the client device.

13. The non-transitory computer readable storage medium of claim 11, further comprising instructions to cause the one or more processors to execute the operations of:

prior to conveying the login credentials from the API proxy to the API of the first application, transforming the login credentials to allow the API proxy to authenticate the session on behalf of the client device.

14. The non-transitory computer readable storage medium of claim 11, wherein the login credentials received from the client device is a Security Assertion Markup Language (SAML) Holder of Key token.

15. The method of claim 1, wherein the additional user data associated with a session comprises at least one of: partially created objects, or contents of a shopping cart in an online store application.

16. The computing device of claim 6, wherein the additional user data associated with a session comprises at least one of: partially created objects, or contents of a shopping cart in an online store application.

17. The non-transitory computer readable storage medium of claim 11, wherein the additional user data associated with a session comprises at least one of: partially created objects, or contents of a shopping cart in an online store application.

* * * * *